(12) United States Patent
Serdarevic et al.

(10) Patent No.: US 8,729,829 B2
(45) Date of Patent: May 20, 2014

(54) POWER SUPPLY ARRANGEMENT AND METHOD FOR THE POWER SUPPLY OF AN ELECTRICAL LOAD

(75) Inventors: Emir Serdarevic, Feldkirchen bei Graz (AT); Andreas Hartberger, Graz (AT)

(73) Assignee: ams AG, Unterpremstätten (AT)

( * ) Notice: Subject to any disclaimer, the term of this patent is extended or adjusted under 35 U.S.C. 154(b) by 173 days.

(21) Appl. No.: 13/234,064

(22) Filed: Sep. 15, 2011

(65) Prior Publication Data

US 2012/0119677 A1    May 17, 2012

(30) Foreign Application Priority Data

Sep. 15, 2010  (DE) .......................... 10 2010 045 389

(51) Int. Cl.
*H05B 37/02*    (2006.01)
(52) U.S. Cl.
USPC .................. 315/307; 315/185 R; 315/294
(58) Field of Classification Search
USPC ............. 315/185 R, 192, 291, 294, 297, 307, 315/308, 312
See application file for complete search history.

(56) References Cited

U.S. PATENT DOCUMENTS

| | | | |
|---|---|---|---|
| 6,621,235 B2* | 9/2003 | Chang | 315/216 |
| 7,180,278 B2 | 2/2007 | Tai et al. | |
| 2006/0028150 A1 | 2/2006 | Vitunic et al. | |
| 2007/0195025 A1* | 8/2007 | Korcharz et al. | 345/82 |
| 2009/0212717 A1 | 8/2009 | Trattler | |
| 2010/0013411 A1 | 1/2010 | Krespach et al. | |
| 2010/0033110 A1* | 2/2010 | Chien | 315/294 |
| 2011/0062872 A1* | 3/2011 | Jin et al. | 315/122 |
| 2011/0084619 A1* | 4/2011 | Gray et al. | 315/185 R |
| 2012/0181939 A1* | 7/2012 | Szczeszynski et al. | 315/186 |
| 2012/0228934 A1* | 9/2012 | Singnurkar | 307/24 |
| 2013/0154494 A1* | 6/2013 | Hoogzaad et al. | 315/210 |

FOREIGN PATENT DOCUMENTS

| | | |
|---|---|---|
| DE | 10 2005 028 403 | 12/2006 |
| DE | 10 2006 059 355 | 6/2008 |
| DE | 10 2008 003 976 | 7/2009 |

OTHER PUBLICATIONS

"AS3693B—16 channel high precision LED controller for LCD backlight (External FET)", Product Brief, austriamicrosystems AG, Rev. 1.0/Jun. 26, 2008, pp. 1-3.
Austria Microsystems, "AS3691: 4 Precision 400mA Current Sources for RGB and Single Color Leds," Datasheet, Rev. 2.3, 22 pages, retrieved Apr. 19, 2010 from <www.austriamicrosystems.com>.

* cited by examiner

*Primary Examiner* — Tung X Le
(74) *Attorney, Agent, or Firm* — McDermott Will & Emery LLP (57) ABSTRACT

A power supply arrangement (10) comprises a voltage regulator (11), a driver circuit (28), and a control circuit (32). The voltage regulator (11) has a voltage regulator input (12) for the feeding of an input voltage (VIN), a voltage regulator output (13) to which an electrical load (20) is coupled that comprises a current source (21), a feedback input (14), and a comparator (15) that is coupled at a first input to the feedback input (14). The driver circuit (28) has a driver output (30) that is connected to a control terminal of the current source (21). The control circuit (32) comprises a control comparator (33) that is coupled at a first input with a signal output (44) of the driver circuit (28) and at an output with the feedback input (14) and also to which, at a second input, a reference signal (SR) can be fed.

16 Claims, 6 Drawing Sheets

POWER SUPPLY ARRANGEMENT AND METHOD FOR THE POWER SUPPLY OF AN ELECTRICAL LOAD

RELATED APPLICATIONS

This application claims the priority of German application no. 10 2010 045 389.7 filed Sep. 15, 2010, the entire content of which is hereby incorporated by reference.

FIELD OF THE INVENTION

The present invention relates to a power supply arrangement and to a method for the power supply of an electrical load.

BACKGROUND OF THE INVENTION

An electrical load could comprise one light-emitting diode, abbreviated LED, or more. An LED is often operated such that a current source is arranged in series to the LED.

The document DE 10 2005 028 403 A1 describes a current-source arrangement for the supply of several electrical loads with electrical energy. Here, LEDs are arranged in series to a field-effect transistor and a resistor. A node between the field-effect transistor and the LED or a control terminal of the field-effect transistor is connected via a signal line to a feedback input of a direct-voltage regulator.

SUMMARY OF THE INVENTION

One object of the present invention is to disclose a power supply arrangement and also a method for the power supply of an electrical load in which the efficiency is high.

In one embodiment, a power supply arrangement for the driving of an electrical load, in particular, a light-emitting diode, comprises a driver circuit. The driver circuit has a driver output and a signal output.

The driver output is designed for the provision of a driver signal to a current source that can be coupled to the driver output. A load circuit that can be coupled comprises the current source and a means for connecting the electrical load. The signal output is designed for the provision of a measurement signal. The measurement signal can be determined by measuring the current of the driver signal. The measurement signal is provided for setting an output voltage. The output voltage can be fed to the load circuit that can be coupled.

Thus, the output signal depends on the measurement signal and thus on the current value of the driver signal. A high current value of the driver signal could indicate, for example, an output voltage that is too low. In contrast, a very low current value of the driver signal could indicate an output voltage that is too high. In this case, if the output voltage is reduced, then the energy consumption of the current source decreases. Therefore, the efficiency can be advantageously increased through the setting of the output voltage as a function of the current value of the driver signal.

In one embodiment, the power supply arrangement comprises the current source. The current source could have a transistor. The current source could further comprise a resistor that is arranged in series to the transistor. A load current could flow through the current source.

In one refinement, the transistor is a field-effect transistor. The gate terminal of the field-effect transistor is coupled with the driver output.

In one preferred refinement, the transistor is a bipolar junction transistor. A driver signal can be applied to the driver output. The base terminal of the bipolar junction transistor is coupled with the driver output. The driver signal thus can be a base current flowing through a base terminal of the bipolar junction transistor. If the base current is very high, then the power supply arrangement is advantageously designed such that the output voltage is increased. Due to the increase of the output voltage, the base current is reduced in turn. Advantageously, the bipolar junction transistor has a lower parasitic input capacitance than does a field-effect transistor. Advantageously, a discrete bipolar junction transistor is more economical than a discrete field-effect transistor.

According to various embodiments, the driver circuit comprises a first complementary transistor pair with a first and a second transistor, wherein a node between a controlled section of the first transistor and a controlled section of the second transistor is coupled with the signal output of the driver circuit. The driver circuit further comprises a second complementary transistor pair with a third and a fourth transistor, wherein a node between a controlled section of the third transistor and a controlled section of the fourth transistor is coupled with the driver output.

The second complementary transistor pair provides a signal at the node between the third and the fourth transistor which is representative for the driver signal which is provided to the current source. The current of the driver signal is mirrored and converted into a voltage that can be fed into the feedback loop of a voltage converter by means of the first and the second complementary transistor pair.

According to further various embodiments, the current source comprises a transistor which is realized as a bipolar junction transistor and which is coupled at its base terminal to the driver output. A resistor of the current source couples the transistor to the reference potential terminal. Additionally, the driver circuit comprises a compensation circuit having an additional current source which couples the node between the transistor and the resistor to the reference potential terminal. The current through the further current source compensates the base current. Thus, the compensation circuit has the effect that the load current that flows through the load is equal to a predetermined value of the load current.

In one embodiment, a lighting arrangement comprises the power supply arrangement, wherein the electrical load comprises at least one LED. The at least one LED is arranged in series to the current source. At least one LED could be used for backlighting.

In one embodiment, the power supply arrangement is designed to recognize a lack of contact in the at least one LED.

In one embodiment, a method for the power supply of an electrical load, in particular, a light-emitting diode, comprises a conversion of an input voltage into an output voltage with which a load circuit is supplied as a function of a feedback signal. A load current flowing through the load circuit is set by means of a driver signal. A measurement signal is provided that is determined by a measurement of the current value of the driver signal. The feedback signal is generated as a function of the measurement signal.

Advantageously, the operating point of the current source can be determined with the aid of the measurement signal. Advantageously, the measurement signal allows a determination as to whether the output voltage has a value that is too low or too high. The conversion of the input voltage into the output voltage is set such that the output voltage is sufficiently high, but is no more than sufficiently high. Therefore, a high efficiency is achieved.

The driver signal could be a base current that is fed to a control terminal of a transistor that consists of the current source.

In one embodiment, the output voltage is directly dependent on the driver signal.

In one alternative embodiment, the output voltage is indirectly dependent on the driver signal. In order to achieve this, the output voltage could be dependent on a voltage generated by means of the driver signal, on a current signal generated by a mirroring of the driver signal, or on a voltage that generates a current signal generated by means of the mirroring of the driver signal.

BRIEF DESCRIPTION OF THE DRAWINGS

The invention will be explained in detail below using several embodiments with reference to the figures. Components and circuitry parts that are identical in terms of function or effect carry identical reference symbols. When circuitry parts or components correspond in their functioning, their description will not be repeated for each of the following figures.

DETAILED DESCRIPTION OF THE DRAWINGS

Figure 1A:
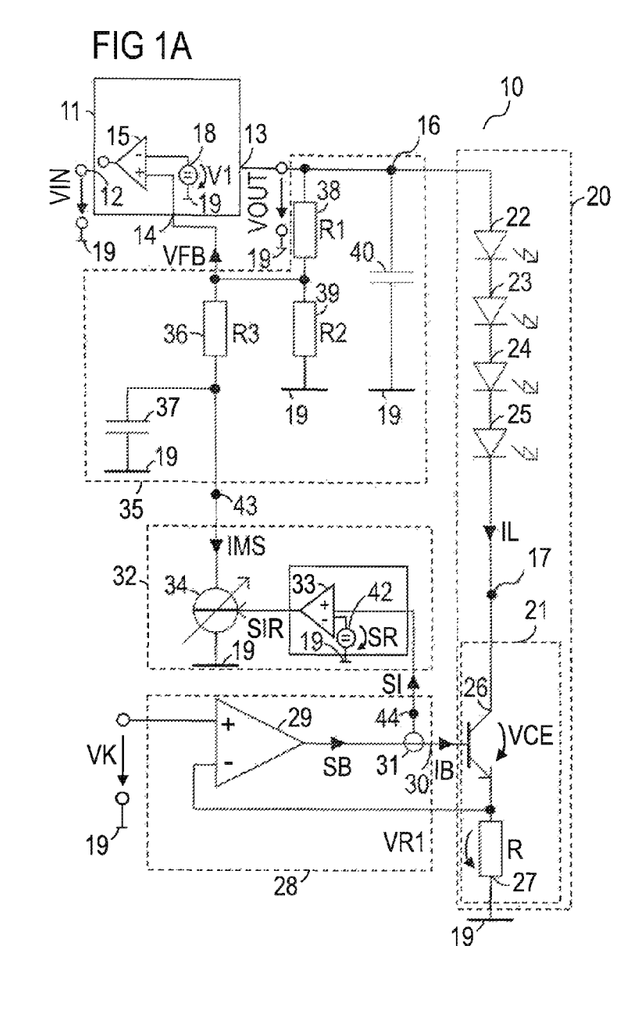
FIGS. 1A to 1C show an example embodiment of a power supply arrangement according to the invention.

FIG. 1A shows an example power supply arrangement according to the invention. The power supply arrangement 10 comprises a voltage regulator 11 with a voltage regulator input 12, a voltage regulator output 13, and a feedback input 14. The voltage regulator 11 further comprises a comparator 15. The first input of the comparator 15 is connected to the feedback input 14. The second input of the comparator 15 is connected via a direct-voltage source 18 to a reference potential terminal 19. The voltage regulator 11 is realized as a direct-voltage-direct-voltage converter, abbreviated DC-DC converter. In addition, the power supply arrangement 10 comprises a load circuit 20. The load circuit 20 has a current source 21 and a means for connecting an electrical load. The means for connecting the electrical load has a first and a second terminal 16 and 17. The first terminal 16 is connected to the voltage regulator output 13. The second terminal 17 is connected to the current source 21. The current source 21 connects the second terminal 17 to the reference potential terminal 19. The electrical load comprises four LEDs 22-25. The four LEDs 22-25 are arranged in series with respect to each other and in series to the current source 21. The load circuit 20 couples the voltage regulator output 13 with the reference potential terminal 19. Here, the series circuit comprising the four LEDs 22-25 is connected at the voltage regulator output 13 and the current source 21 is connected at the reference potential terminal 19. The current source 21 has a transistor 26. The transistor 26 is realized as a bipolar junction transistor. A resistor 27 of the current source 21 couples the bipolar junction transistor 26 with the reference potential terminal 19.

In addition, the power supply arrangement 10 has a driver circuit 28. The driver circuit 28 comprises a differential amplifier 29. A first input of the differential amplifier 29 is connected to a tap of the current source 21. In order to achieve this, the first input of the differential amplifier 29 is connected to a node between the transistor 26 and the resistor 27. The driver circuit 28 has a driver output 30. The driver output 30 is connected to a control terminal of the current source 21. A first output of the differential amplifier 29 is coupled via the driver output 30 with the control terminal of the current source 21. The driver circuit 28 comprises a current sensor 31. The current sensor 31 is arranged between the first output of the differential amplifier 29 and the driver output 30.

The power supply arrangement 10 further comprises a control circuit 32. The control circuit 32 has a control comparator 33. A first input of the control comparator 33 is connected via the signal output 44 of the driver circuit 28 to the current sensor 31. A second input of the control comparator 33 is connected via a reference signal source 42 of the control circuit 32 to the reference potential terminal 19. In addition, the control circuit 32 comprises a measuring current source 34 that is connected at a control input to an output of the control comparator 33. On one output, the measuring current source 34 is coupled via a node 43 with the feedback input 14. The measuring current source 34 is further connected at the reference potential terminal 19.

The power supply arrangement 10 also comprises an impedance network 35. The impedance network 35 has a first resistor 36 that is arranged between the control circuit 32 and the feedback input 14. In addition, the output of the control circuit 32 is connected via a first capacitor 37 to the reference potential terminal 19. The impedance network 35 is further coupled with the voltage regulator output 13. In order to achieve this, the impedance network 35 has a voltage divider comprising a first and a second voltage-divider resistor 38 and 39. The voltage divider connects the voltage regulator output 13 to the reference potential terminal 19. A tap between the first and the second voltage-divider resistors 38 and 39 is connected to the feedback input 14. In addition, the impedance network 35 comprises a smoothing capacitor 40. The smoothing capacitor 40 is arranged between the voltage regulator output 13 and the reference potential terminal 19.

An input voltage VIN drops between the voltage regulator input 12 and the reference potential terminal 19. A feedback signal VFB is fed to the feedback input 14. From the input voltage VIN, the voltage regulator 11 generates an output voltage VOUT as a function of the feedback signal VFB. The output voltage VOUT drops between the voltage regulator output 13 and the reference potential terminal 19. The output voltage VOUT has, in general, a value that is different from the input voltage VIN. The output voltage VOUT has a higher value than the input voltage VIN. For example, the value for the output voltage VOUT could equal 24 V and the value for the input voltage VIN could equal 5 V. The output voltage VOUT is fed to the load circuit 20. A series circuit comprising the four LEDs 22-25 and the current source 21 is operated with the output voltage VOUT.

A load current IL flows through the electrical load and the load circuit 20. The load current IL generates a first voltage VR1 in the resistor 27. The first voltage VR1 is fed to the first input of the differential amplifier 29. A constant voltage VK is further fed to a second input of the differential amplifier 29. The differential amplifier 29 provides a driver signal SB on its first output. The driver signal SB has both a voltage value and also a current value. The driver signal SB is fed via the driver output 30 to the control terminal of the current source 21. The driver signal SB is fed to the base terminal of the transistor 26.

The current sensor 31 generates a measurement signal SI. The measurement signal SI is fed to the first input of the control comparator 33. The measurement signal SI is a function of the driver signal SB. The measurement signal SI depends on the value of the current flowing through the current sensor 31 and thus through the driver output 30. The reference signal source 42 outputs a reference signal SR. The reference signal source 42 is realized as a voltage source. The reference signal SR has a constant voltage value. At the output of the control comparator 33, a comparator signal SIR can be tapped that is fed to the control input of the measuring current source 34. The comparator signal SIR depends on a comparison of the measurement signal SI and the reference signal SR. A current-source current IMS flows through the measuring current source 34. The feedback signal VFB depends on the output signal VOUT and the current-source current IMS. The feedback signal VFB is realized as a voltage. The feedback signal VFB is compared with a threshold value V1 by the comparator 15.

For example, if the output voltage VOUT is too low, then the first voltage VR1 drops below the specified value of the constant voltage VK. The differential amplifier 29 thus generates the driver signal SB with a value that sets the transistor 26 in a strongly conductive state. In order to achieve this, the driver signal SB has a higher current value that leads to a higher value of the measurement signal SI. The control comparator 33 and the measuring current source 34 are designed so that, for a rising measurement signal SI, the current-source current IMS increases. Therefore, the feedback signal VFB drops. If the feedback signal VFB drops below the threshold value V1, the comparator 15 outputs a signal at its output such that the voltage regulator 11 generates a higher output voltage VOUT from the input voltage VIN. For example, if the output voltage VOUT drops due to a decreasing input voltage VIN, then the feedback signal VFB is also reduced by means of the voltage divider with the first and the second voltage-divider resistors 38 and 39. Therefore, in this way, the voltage regulator 11 can also be set so that it generates an increased output voltage VOUT.

The impedance network 35 causes a slow increase of the output voltage VOUT after a start-up, up to a maximum value of the output voltage VOUT. The first capacitor 37 is used for setting the speed with which the voltage regulator 11 reacts to changes in the current-source current IMS and thus to changes in the driver signal SB. The control circuit 32 derives the current-source current IMS from the impedance network 35 and therefore changes the feedback signal VFB. The power supply arrangement 10 is designed such that the output voltage VOUT is set as low as possible for supplying of the load circuit 20.

The current sensor 31 measures the current value of the driver signal SB. If the transistor 26 is realized as a bipolar junction transistor, then the current value of the driver signal SB corresponds to the base current IB of the transistor 26. Thus, the current sensor 31 measures the base current IB of the transistor 26. A current-source current IMS is provided as a function of the base current IB. The value of the load current IL corresponds to the value of the base current IB multiplied with a conversion factor B. If the base current IB increases, then the control comparator 33 sets the measuring current source 34 such that the feedback signal VFB decreases.

Advantageously, both a falling load current IL and also a decrease in the output voltage VOUT lead to a change in the setting of the voltage regulator 11. The signal on the output of the comparator 15 can be designed to provide a higher clock rate or a changed pulse-duty factor for the voltage regulator 11, so that a higher value is achieved for the output voltage VOUT. The power loss PL falling in the transistor 26 can be calculated according to the following equation from the value of the load current IL and the value of the collector-emitter voltage VCE falling across the transistor 26:

$$PL = IL \cdot VCE$$

The current-source current IMS is influenced by the operating point of the transistor 26 of the current source 21. The bipolar junction transistor is preferably operated at an operating point that is located within the saturation range, but as close as possible to the inflection point of the characteristic curve. At this point of the operation, a minimal power loss PL is achieved. The power loss PL decreases when the collector-emitter voltage VCE can be reduced. Advantageously, the feedback via the feedback signal VFB has the result that the collector-emitter voltage VCE and consequently the power loss PL assume the smallest possible value. As a result of the control loop, the power supply arrangement 10 sets an equilibrium operating point of the voltage regulator 11 and the transistor 26.

The current through the driver output 30 and thus the base current IB begin to rise as soon as the collector-emitter voltage VCE of the transistor 26 approaches the inflection voltage. The current flowing through the driver output 30 is monitored by the control circuit 32, so that a current-source current IMS is generated that sets the feedback signal VFB. Corresponding to the input characteristic curve map, the base current IB and thus the current through the driver output 30 change more strongly than does the voltage value of the driver signal SB and thus a base voltage on the base of the transistor 26. Therefore, advantageously a more exact control of the power supply arrangement 10 is achieved as a function of the current value flowing through the driver output 30 compared with the voltage value applied to the driver output 30.

Detection as to whether the load current IL is leaving its control range can be realized by means of the monitoring of the first voltage VR1 on the resistor 27. The first voltage VR1 is, in general, equal to the constant voltage VK. The first voltage VR1 and the constant voltage VK are compared by means of the differential amplifier 29. As long as the difference between the first voltage VR1 and the constant voltage VK is zero or approximately zero, the control is in operation and the load current IL has a specified load current value. A decrease of the load current IL can be determined by means of the monitoring of the first voltage VR1. If the first voltage VR1 should fall permanently below the constant voltage VK, then the driver circuit 28 would no longer be able to sufficiently regulate the current source 21. The first voltage VR1 allows the determination concerning how the load current IL has changed. The driver signal SB begins to rise already if the regulation in the driver circuit 28 demands a higher value for the load current IL than the current value. Thus, it is advantageous to monitor the driver signal SB in order to set the voltage regulator 11.

Advantageously, the control circuit 32 needs no connection to the load circuit 20, because the control circuit 32 is connected to the signal output 44 of the driver circuit 28. Thus, the number of pins for connecting to the load circuit 20 is kept small.

In an alternative, not-shown embodiment, the electrical load comprises a number of LEDs that is different from four. The number of LEDs could be one. The number of LEDs equals at least one.

In an alternative, not-shown embodiment, the voltage regulator 13 is realized as a linear regulator.

In an alternative, not-shown embodiment, the driver signal SB has a current value that is compared directly with a reference signal provided as a reference current. Alternatively, the driver signal SB is fed mirrored before the current generated by the mirroring is compared with the reference current. The reference signal source 42 is implemented in this embodiment as a current source. The control comparator 33 is in this case designed to compare currents on its first and second input. A reference signal SR output from the reference signal source 42 can be constant or variable.

In an alternative, not-shown embodiment, at least one signal is also fed to the control circuit 32, with this group comprising the voltage value of the driver signal SB, the base-emitter voltage of the transistor 26, a signal representing the current amplification factor of the transistor 26, the voltage that can be tapped at the second terminal 17, and the collector-emitter voltage of the transistor 27. The output voltage VOUT is then formed as a function of the at least one signal from this group and of the measurement signal SI.

In an alternative, not-shown embodiment, the comparator 15 is implemented as an analog-digital converter, abbreviated AD converter, with a digital circuit connected downstream. The AD converter is connected at one input to the feedback terminal 14. The digital circuit compares the feedback signal VFB digitized by the AD converter with the digital value of the threshold value V1.

Figure 1B:
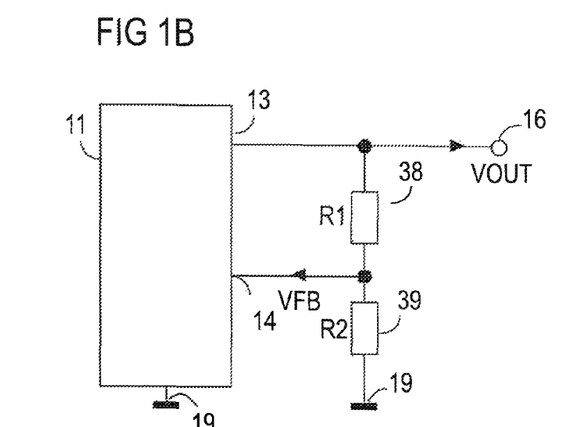
Figure 1C:
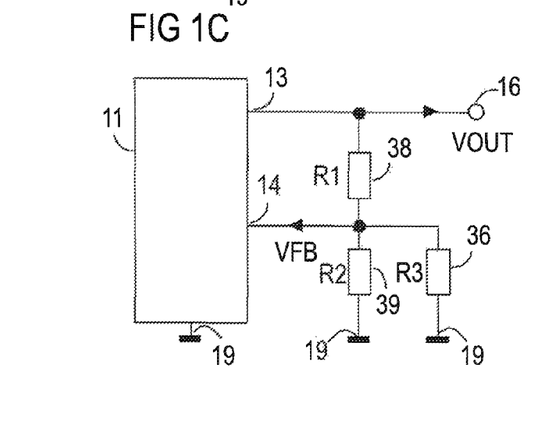

FIGS. 1B and 1C are used for explaining the functioning of the impedance network 35 in the power supply arrangement 10. The impedance network 35 according to FIG. 1B has exclusively the voltage divider with the first and the second voltage divider resistors 38 and 39. The threshold value V1 output by the direct-voltage source 18 is constant and specified. The threshold value V1 frequently is set by the manufacturer of the voltage regulator 11. In the steady state, the voltage difference between the first and the second input of the comparator 15 is approximately 0 V. Thus, the feedback signal VFB assumes approximately the value of the threshold value V1. The minimal value VOUTMIN of the output voltage VOUT can be calculated according to the following equation:

$$VOUTMIN = \frac{(R1 + R2)}{R2} \cdot V1,$$

where R1 is the resistance value of the first voltage-divider resistor 38 and R2 is the resistance value of the second voltage-divider resistor 39. Thus, with the selection of the resistance values R1 and R2, the minimum output voltage VOUTMIN can be specified.

In FIG. 1C, the impedance network 35 comprises the voltage divider with the first and the second voltage-divider resistors 38 and 39 and the first resistor 36. The first resistor 36 connects the feedback input 14 to the reference potential terminal 19. The first resistor 36 is thus arranged parallel to the second voltage-divider resistor 39. This operating state is achieved when the measuring current source 34 is set as a current sink with the minimum possible conducting-state DC resistance. This occurs at high values of the measurement signal SI. Because here the value of the feedback signal VFB is also approximately the threshold value V1, in FIG. 1C the value of the output voltage VOUT also increases to a maximum voltage value VOUTMAX that can be calculated according to the following equation:

$$VOUTMAX = \frac{R1 + R2 \| R3}{R2 \| R3} \cdot V1$$

The measuring current source 34 in FIG. 1A generates the measurement source current IMS that flows through the first resistor 36. If the current source current IMS assumes the value zero, then the first resistor 36 does not influence the feedback signal VFB and the output voltage VOUT assumes the value VOUTMIN shown in FIG. 1B. In contrast, if a high current flows through the measuring current source 34; that is, if the current source current IMS assumes a high value, then the output voltage VOUT increases to the value VOUTMAX derived with the aid of FIG. 1C.

Figure 2A:
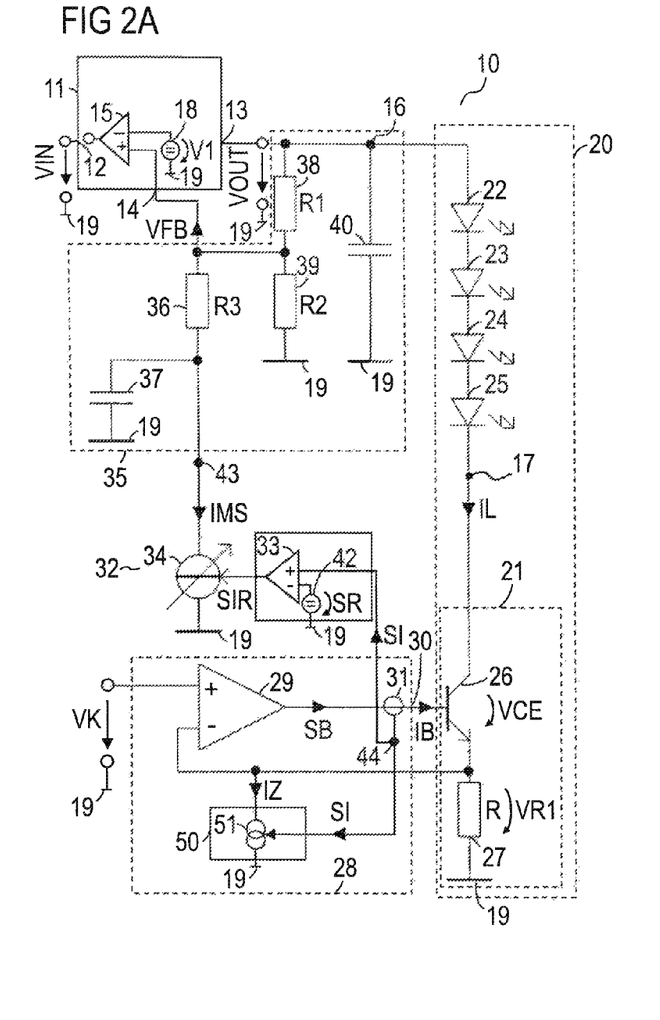
FIGS. 2A and 2B show other example embodiments of a power supply arrangement according to the invention.

FIG. 2A shows another example embodiment of the power supply arrangement according to the invention that is a refinement of the embodiment shown in FIG. 1A. In addition, the driver circuit 28 comprises a compensation circuit 50. The compensation circuit 50 connects the node between the transistor 26 and the resistor 27 to the reference potential terminal 19. The control input of the compensation circuit 50 is connected to the output of the current sensor 31. The compensation circuit 50 has an additional current source 51. A control input of the additional current source 51 is connected by means of the control input of the compensation circuit 50 to the output of the current sensor 31. The additional current source 51 thus couples the node between the transistor 26 and the resistor 27 with the reference potential terminal 19.

An additional current IZ flowing through the additional current source 51 thus flows parallel to the current flowing through the resistor 27 to the reference potential terminal 19. If the transistor 26 is realized as a bipolar junction transistor, then the additional current IZ compensates the base current IB. Advantageously, the compensation circuit 50 leads to the result that the load current IL corresponds precisely to the specified load current value.

In a not-shown embodiment, the base current IB is mirrored, further processed, and drawn from the emitter of the transistor 26.

Figure 2B:
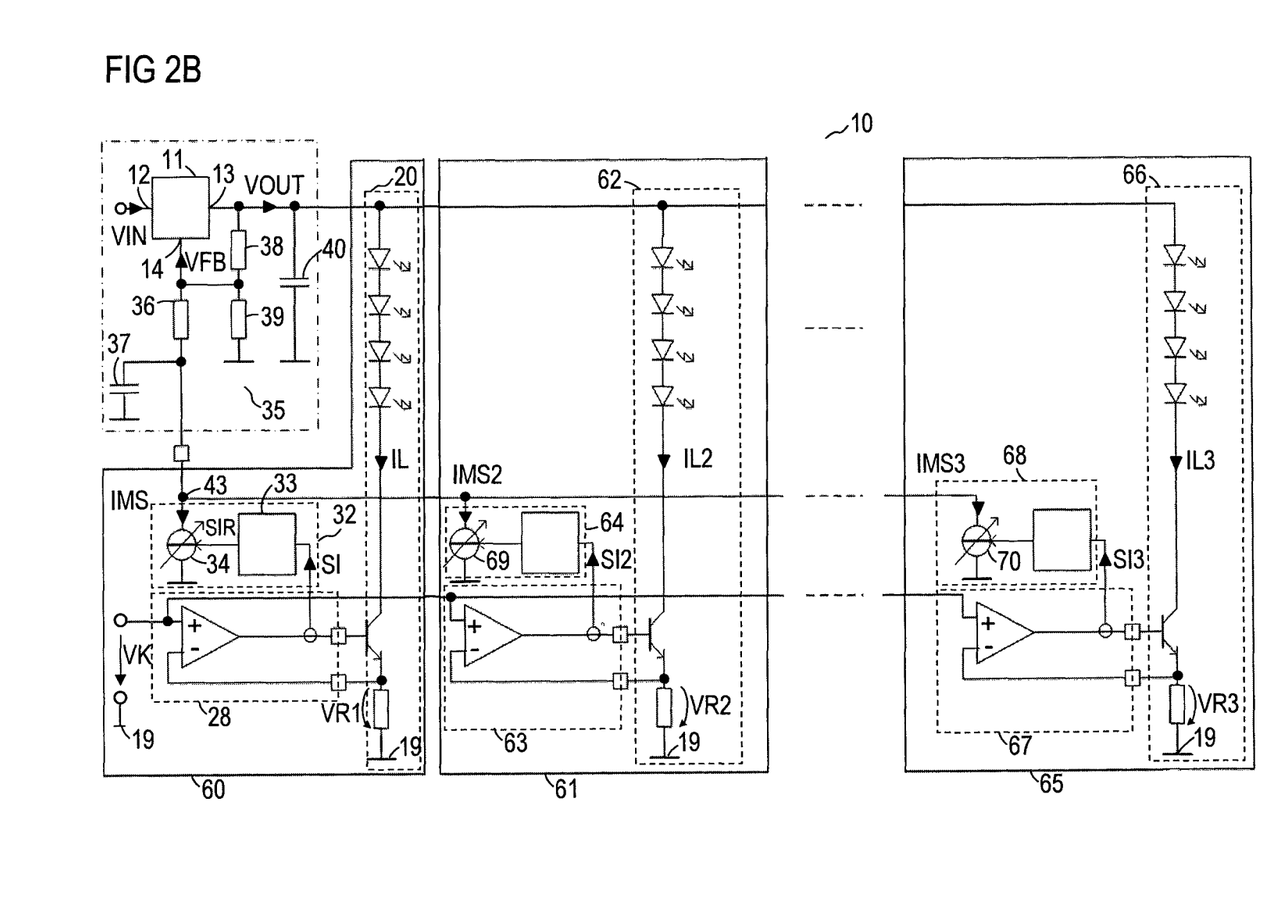

FIG. 2B shows another example embodiment of the power supply arrangement that is a refinement of the embodiments shown in FIGS. 1A and 2A. The power supply arrangement 10 comprises a first circuit arrangement 60 that has the load circuit 20, the driver circuit 28, and the control circuit 32, which is realized as shown in FIG. 1A or 2A. The control circuit 32 is connected via the node 43 to the impedance network 35. The power supply arrangement 10 further comprises a second circuit arrangement 61 that has a second load circuit 62, a second driver circuit 63, and a second control circuit 64. In addition, the power supply arrangement 10 comprises a third circuit arrangement 65 that has a third load circuit 66, a third driver circuit 67, and a third control circuit 68. The second and the third load circuits 62 and 66 are built like the load circuit 20. The second and the third driver circuits 63 and 67 are realized in the same manner as the driver circuit 28. The second and the third control circuits 64, 68 are constructed like the control circuit 32 accordingly. The output of the second control circuit 64 is connected to the node 43. The output of the third control circuit 64 is connected to the node 43 accordingly. The node 43 is thus used as a node for summing currents. A second measuring current source 69 of the second control circuit 64 thus couples the node 43 with the reference potential terminal 19. Analogously, a third measuring current source 70 of the third control circuit 68 couples the node 43 with the reference potential terminal 19.

A second load current IL2 flows through the second load circuit 62. The second load current IL2 generates a second voltage VR2 on a resistor of the second load circuit 62. The constant voltage VK is fed to a differential amplifier of the second driver circuit 63. Through the selection of the resistance value of the resistor 27 of the load circuit 20 and through the selection of the resistance value of the corresponding resistor of the second load circuit 62, it can be set whether the load current IL and the second load current IL2 have different current values or the same current value in the steady state. The second load current IL2 can be calculated according to the following equation:

$$IL2 = \frac{VK}{R2'} = \frac{IL \cdot R1'}{R2'},$$

where R1' is the resistance value of the resistor 27 of the load circuit 20 and R2' is the resistance value of the resistor of the second load circuit 62. A corresponding situation applies for the third load circuit 66.

The voltage regulator 11 supplies the load circuit 20 and the second and the third load circuits 62 and 66. The power supply arrangement thus has three channels. Each of the first, second, and third circuit arrangements 60, 61, and 65 comprises an internal regulator that is realized by means of the driver circuit 28 and the second and the third driver circuits 63 and 67, respectively. The current source current IMS of the measuring current source 34 as well as a second current source current IMS2 that is generated by the second measuring current source 69 of the second control circuit 64 and a third current source current IMS3 that flows through the third measuring current source 70 of the third control circuit 68 are added in node 43. The sum of the current source currents IMS, IMS2, IMS3 influences the feedback signal VFB by means of the impedance network 35.

In one of the three load circuits 20, 62, 66, if the operating point of the associated transistor approaches the inflection point, then this load circuit influences, above all, the feedback signal VFB.

In a not-shown, alternative embodiment, the load circuit 20 and the second and the third load circuits 62, 66 are switched on or off within the time domain in a multiplexed operation. In the case of a multiplexed operation of the three load circuits 20, 62, 66, the feedback can also be realized by means of the control circuit 32, the second and the third control circuits 64, 68, as well as the node 43 and the impedance network 35.

Advantageously, the three load circuits 20, 62, 66 are contacted exclusively by means of the voltage regulator output 13, the reference potential terminal 19, and the driver outputs of the three driver circuits 28, 63, 67 and the connections of the three driver circuits 28, 63, 67 to each of the nodes between the resistor and the transistor of the three load circuits 20, 62, 66. Another contact of the power supply arrangement 10 to the three load circuits 20, 62, 66 is not necessary. Therefore, the total number of terminals, the surface area on a not-shown semiconductor body on which the power supply arrangement is arranged without the load circuit 20, and, consequently, the costs for the realization are kept low.

The semiconductor body could comprise the three driver circuits 28, 63, 67 and the three control circuits 32, 64, 68. The LEDs 22-25 are connected to the semiconductor body. The impedance network 35 is connected to the semiconductor body.

In one refinement, the semiconductor body also comprises the voltage regulator 11.

In addition, the semiconductor body could comprise the current sources of the load circuits 20, 62, 66.

In an alternative, not-shown embodiment, the power supply arrangement comprises the circuit arrangement 60 and the second circuit arrangement 61, but not the third circuit arrangement 65. In an alternative, not-shown embodiment, the power supply arrangement 10 comprises at least one other circuit arrangement that is realized like the first, second, or third circuit arrangement 60, 61, or 65.

In an alternative, not-shown embodiment, the power supply arrangement 10 is designed to recognize a lack of contact for an LED and to switch the associated load circuit 20, 62, 66 to be inactive.

Figure 3A:
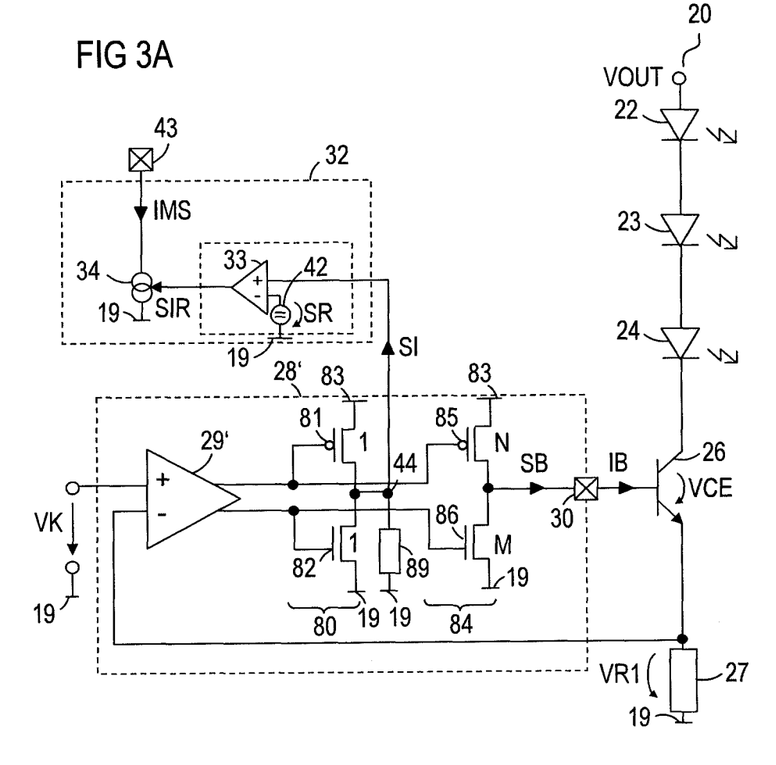
FIGS. 3A to 3D show example embodiments of a driver circuit and a control circuit according to the invention.

FIG. 3A shows an example embodiment of a driver circuit 28' that is a refinement of the driver circuit shown in FIGS. 1A, 2A, and 2B. The driver circuit 28' according to FIG. 3A can be used in the power supply arrangement 10 according to FIGS. 1A, 2A, and 2B. The driver circuit 28' comprises a first complementary transistor pair 80 with a first and a second transistor 81 and 82. A controlled path of the first transistor 81 and a controlled path of the second transistor 82 are arranged in series to each other. The series circuit comprising the controlled paths of the first and the second transistors 81, 82 is arranged between a power-supply terminal 83 and the reference potential terminal 19. The first transistor 81 is realized as a p-channel field-effect transistor and the second transistor 82 is realized as an n-channel field-effect transistor. The power-supply terminal 83 could be connected to the voltage regulator input 12.

A node between the controlled path of the first transistor 81 and the controlled path of the second transistor 82 is coupled via the signal output 44 with the control circuit 32. To this end, the node between the controlled paths of the first and the second transistors 81, 82 is connected to the first input of the control comparator 33. The differential amplifier 29' has a first output and also a second output. The first output is connected to the control terminal of the first transistor 81. The second output of the differential amplifier 29' is connected to the control terminal of the second transistor 82 accordingly. The first output and the second output of the differential amplifier 29' are realized as differential outputs. In addition, the driver circuit 28' comprises another resistor 89 that connects the signal output 44 to the reference potential terminal 19.

In addition, the driver circuit 28' comprises a second complementary transistor pair 84 with a third and a fourth transistor 85, 86. The third transistor 85 is realized as a p-channel field-effect transistor and the fourth transistor 86 is realized as an n-channel field-effect transistor. A series circuit comprising the controlled paths of the third and the fourth transistors 85, 86 connects the power-supply terminal 83 to the reference potential terminal 19. A node between the controlled path of the third transistor 85 and the controlled path of the fourth transistor 86 is connected to the driver output 30. The first output of the differential amplifier 29' is connected to the control input of the third transistor 85 and the second output of the differential amplifier 29' is connected to the control input of the fourth transistor 86.

The current-driver capability of the second complementary transistor pair 84 is increased relative to the current-driver capability of the first complementary transistor pair 80. The width-to-length ratio of the third transistor 85 has the value of N-times the width-to-length ratio of the first transistor 81. The width-to-length ratio of the fourth transistor 86 further has the value of M-times the width-to-length ratio of the second transistor 82. The value N could be equal to the value M. The second complementary transistor pair 84 thus provides the driver signal SB with which the current source 21 is driven. In contrast, the first complementary transistor pair 80 outputs the measurement signal SI on the node between the controlled paths of the first and the second transistors 81, 82, wherein this measurement signal is fed to the control circuit 32. The first complementary transistor pair 80 provides, on its output, a current that is smaller by the factor N than the current value of the driver signal SB. The current provided by the first complementary transistor pair 80 flows via the other resistor 89 to the reference potential terminal 19 and generates the measurement signal SI, which is the product of the resistance value of the other resistor 89 and the current flowing through the other resistor 89. The measurement signal SI is provided as a voltage. The measurement signal SI thus depends on the current value of the driver signal SB.

Figure 3B:
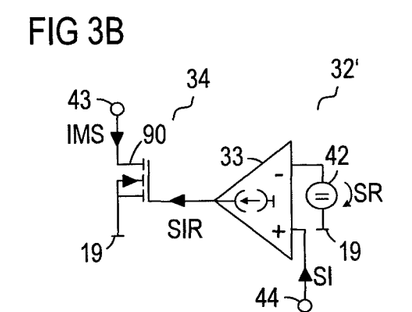

FIG. 3B shows an example embodiment of the control circuit 32 that is a refinement of the control circuit 32 shown in FIGS. 1A, 2A, and 2B. The control circuit 32' according to FIG. 3B can be used in the power supply arrangement according to FIGS. 1A, 2A, 2B, and 3A. The control comparator 33 is realized as an operational transconductance amplifier, abbreviated OTA. As indicated in FIG. 1A, the first input of the control comparator 33 is connected to the signal output 44 and the second input of the control comparator 33 is connected to the reference signal source 42. The measuring current source 34 comprises a current source transistor 90. A controlled path of the current source transistor 90 couples the node 43 with the reference potential terminal 19. The output of the control comparator 33 is connected to the control input of the current source transistor 90. The current source transistor 90 is realized as an n-channel metal-oxide semiconductor field-effect transistor.

The control comparator 33 provides, on its output, the comparator signal SIR that is fed to the control terminal of the current source transistor 90. The control comparator 33 forms the comparator signal SIR as a function of a comparison of the voltages between the first and the second inputs. Advantageously, by means of the realization of the control comparator 33 as an OTA on the output, the comparator signal SIR is output as a current, so that a capacitor of the control terminal of the current source transistor 90 is charged. Therefore, the current source current IMS increases slowly.

Figure 3C:
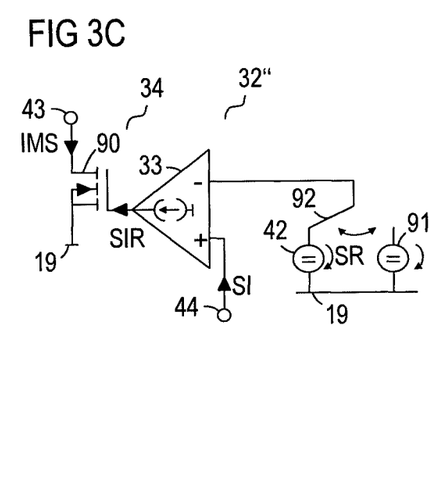

FIG. 3C shows another example embodiment of a control circuit 32". The control circuit 32" comprises another reference signal source 91 that is coupled with the second input of the control comparator 33. The control circuit 32" further comprises a converter 92. A first input of the converter 92 is connected via the reference signal source 42 to the reference potential terminal 19. A second input of the converter 92 is connected via the other reference signal source 91 to the reference potential terminal 19. One output of the converter 92 is connected to the second input of the control comparator 33.

The other reference signal source 91 outputs another reference signal SR'. The other reference signal source 91 is realized as a voltage source. The other reference signal SR' has a constant voltage value. The reference signal SR and the other reference signal SR' have different values. By means of the converter 92 it is adjustable whether the reference signal SR or the other reference signal SR' is fed to the second input of the control comparator 33. Thus, by means of the converter 92 it can be selected at what values of the driver signal SB the control circuit 32 generates a current source current IMS that influences the feedback signal VFB. The position of the converter 92 could depend on the voltage value of the driver signal SB and thus on the base voltage on the base of the transistor 26.

Alternatively, the position of the converter 92 could depend on the current-gain factor of the transistor 26.

In an alternative, not-shown embodiment, at least one other reference signal source is connected via the converter 92 to the second input of the control comparator 33.

Figure 3D:
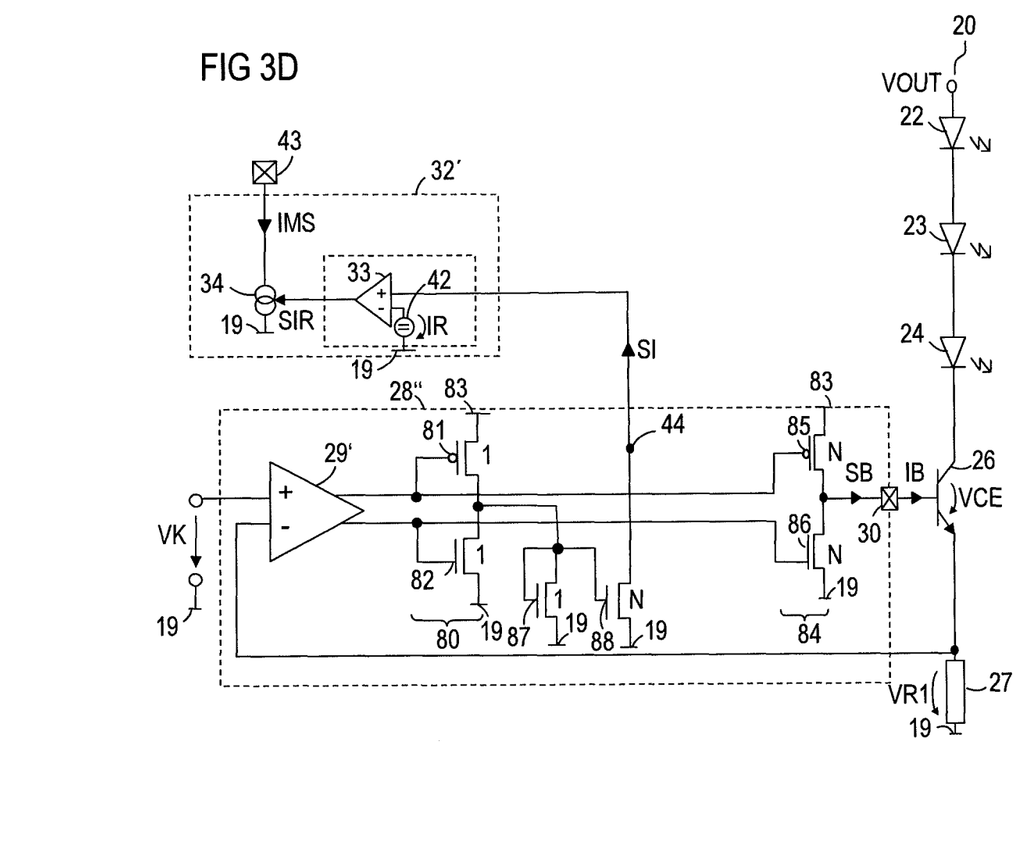

FIG. 3D shows another example embodiment of a driver circuit 28" and a control circuit 32'. The circuitry parts shown in FIG. 3D could be used in a power supply arrangement according to FIGS. 1A, 2A, and 2B. The circuitry parts according to FIG. 3D represent a refinement of the driver circuit and control circuit shown in FIGS. 1A, 2A, 2B, and 3A to 3C. The driver circuit 28" comprises another transistor 87. A controlled path of the other transistor 87 couples the node between the controlled path of the first transistor 81 and the controlled path of the second transistor 82 with the reference potential terminal 19. A control terminal of the other transistor 87 is connected to the node between the controlled path of the first transistor 81 and the controlled path of the second transistor 82. The other transistor 87 is thus switched as a diode. The other transistor 87 is implemented as an n-channel field-effect transistor. The width-to-length ratio of the other transistor 87 corresponds to the width-to-length ratio of the second transistor 82. In addition, the driver circuit 28" comprises an additional transistor 88. A control terminal of the additional transistor 88 is connected to the node between the controlled path of the first transistor 81 and the controlled path of the second transistor 82. A controlled path of the additional transistor 88 connects the signal output 44 to the reference potential terminal 19.

The other transistor 87 and the additional transistor 88 thus form a current mirror. The current mirror couples the node between the controlled path of the first transistor 81 and the controlled path of the second transistor 82 with the signal output 44. The control signal SI is constructed as a current and represents a mirroring of the current flowing through the other transistor 87. A width-to-length ratio of the additional transistor 88 could be N-times of the width-to-length ratio of the other transistor 87. In this case, the control signal SI has approximately the same current value as the driver signal SB. Voltage values of the control signal SI and the driver signal SB, however, could be different. The reference signal source 42 is realized as a current source. The reference signal source 42 outputs the reference signal in the form of a reference current IR. The two inputs of the control comparator 33 are implemented as current inputs. The current comparator 33 is thus constructed as a current amplifier.

In an alternative embodiment, the control comparator 33 is constructed as an operational transconductance amplifier.

In an alternative embodiment, the other and the additional transistors 87, 88 have the same width-to-length ratio. Here, the control signal SI has a current value smaller by the factor N compared with the driver signal SB. In this way, the efficiency of the power supply arrangement 10 increases.

In an alternative, not-shown embodiment, the other transistor 87 is realized as a p-channel field-effect transistor. Here, a control terminal of the other transistor 87 is connected to the reference potential terminal 19.

Figure 4:
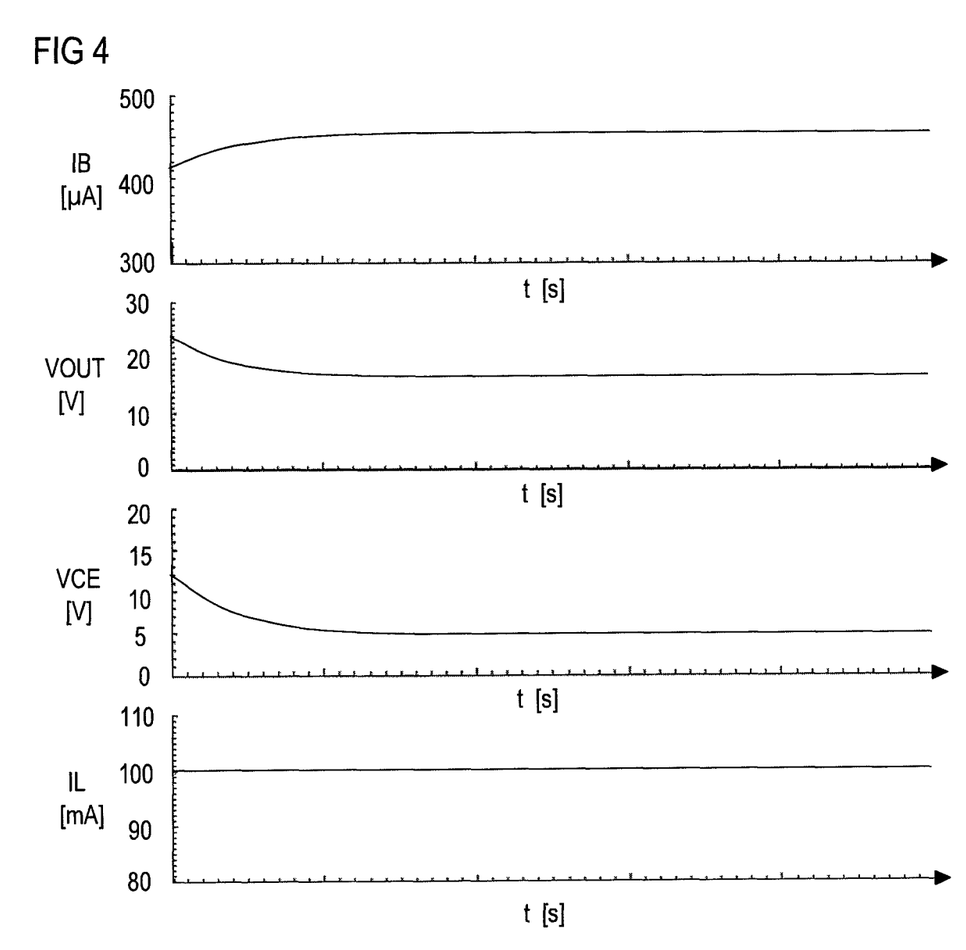
FIG. 4 shows example signal curves in a power supply arrangement according to the invention.

FIG. 4 shows example signal diagrams of a power supply arrangement 10 according to the invention as a function of the time t. Here, the base current IB, the output voltage VOUT, the collector-emitter voltage VCE, and the load current IL are shown.

The decrease in the output voltage VOUT leads to a decrease in the collector-emitter voltage VCE. This results in an increase in the base current IB, so that the load current IL remains constant. Therefore, the load current IL has the specified load current value of, for example, 100 mA.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A power supply arrangement for the driving of an electrical load, in particular, a light-emitting diode, comprising a driver circuit-comprising:
a driver output configured to provide a driver signal to a current source of a load circuit that is configured to be coupled, the load circuit comprising the current source and a means for connecting the electrical load;
a signal output configured to provide a measurement signal that is configured to be determined by a measurement of a current value of the driver signal and is provided for the setting of an output voltage, wherein the output voltage is configured to be fed to the load circuit that is configured to be coupled;
a first complementary transistor pair with a first transistor and a second transistor, wherein a node between a controlled section of the first transistor and a controlled section of the second transistor is coupled with the signal output of the driver circuit; and
a second complementary transistor pair with a third transistor and a fourth transistor, wherein a node between a controlled section of the third transistor and a controlled section of the fourth transistor is coupled with the driver output.

2. The power supply arrangement according to claim 1, wherein the driver circuit is configured to provide the measurement signal by a mirroring of the driver signal.

3. The power supply arrangement according to claim 1, the driver circuit comprising another transistor the controlled section of which couples the node between the controlled section of the first transistor and the controlled section of the second transistor with a reference potential terminal or a supply-voltage terminal, and the control terminal of which is connected to a terminal of the controlled section of the other transistor.

4. The power supply arrangement according to claim 1, the driver circuit comprising a differential amplifier with a first and a second output, wherein the first output of the differential amplifier is connected to a control terminal of the first and the third transistors, and the second output of the differential amplifier is connected to a control terminal of the second and the fourth transistors.

5. The power supply arrangement according to claim 1, comprising a control circuit with a control comparator that is coupled on a first input with the signal output of the driver circuit, to which, on a second input, a reference signal is configured to be fed and also, on the output of which, a comparator signal is configured to be tapped.

6. The power supply arrangement according to claim 5, wherein the control circuit comprises a reference signal source that is coupled with the second input of the control comparator and is adapted to provide the reference signal.

7. The power supply arrangement according to claim 6, wherein the control device comprises at least one other reference signal source that is coupled with the second input of the control comparator such that the reference signal source or the at least one other reference signal source is connected selectively to the second input of the control comparator.

8. The power supply arrangement according to claim 5, wherein the control comparator is an amplifier made from a group comprising an operational transconductance amplifier, a transimpedance amplifier, and a current amplifier.

9. The power supply arrangement according to claim 5, the control circuit comprising a control current source that is coupled at a control input with the output of the control comparator and at the output of which a current source current is configured to be tapped.

10. The power supply arrangement according to claim 1, having a voltage regulator comprising:
a voltage regulator input for the feeding of an input voltage;
a voltage regulator output to which the load circuit is configured to be coupled and to which the output voltage is configured to be tapped; and
a feedback input for the feeding of a feedback signal that is configured to be determined from the measurement signal or a signal derived from this measurement signal and that is adapted for the setting of the voltage conversion from the input voltage into the output voltage.

11. The power supply arrangement according to claim 1, comprising the current source that has a transistor that is a bipolar junction transistor and the base terminal of which is coupled with the driver output.

12. The power supply arrangement according to claim 11, the driver circuit comprising a compensation circuit that couples the emitter or the collector terminal of the transistor with the reference potential terminal or the voltage regulator output.

13. The power supply arrangement according to claim 1, for the driving of at least one other electrical load, comprising at least one other driver circuit each of which having:
a driver output configured for providing a driver signal to a current source of at least one other load circuit that is configured to be coupled and that comprises the current source, and a means for connecting the at least one other electrical load; and
a signal output configured for providing at least one other measurement signal that is configured to be determined by a measurement of a current value of the driver signal and is provided for the setting of the output voltage, wherein the output voltage is configured to be fed to at least one other load circuit that is configured to be coupled.

14. A power supply arrangement for the driving of an electrical load, in particular, a light-emitting diode, comprising a current source and a driver circuit having:
a driver output configured for providing a driver signal to a current source of a load circuit that is configured to be coupled, the load circuit comprising the current source and a means for connecting the electrical load, wherein the current source has a transistor that is a bipolar junction transistor and the base terminal of which is coupled with the driver output;
a signal output configured for providing a measurement signal that is configured to be determined by a measurement of a current value of the driver signal and is provided for the setting of an output voltage, wherein the output voltage is configured to be fed to the load circuit that is configured to be coupled; and
a compensation circuit having an additional current source which couples the node between the transistor and a resistor to a reference potential terminal.

15. A method for the power supply of an electrical load, comprising:
conversion of an input voltage into an output voltage with which a load circuit is powered as a function of a feedback signal;
setting of a load current flowing through the load circuit by means of a driver signal;
provision of a measurement signal that is determined by a measurement of a current value of the driver signal; and
generation of the feedback signal as a function of the measurement signal,
wherein the load circuit is coupled to a voltage regulator, the voltage regulator comprising:

a voltage regulator input for the feeding of the input voltage, a voltage regulator output to which the load circuit is configured to be coupled and to which the output voltage is configured to be tapped, and a feedback input for the feeding of the feedback signal that is configured to be determined from the measurement signal or a signal derived from this measurement signal and that is adapted for the setting of the voltage conversion from the input voltage into the output voltage.

16. A power supply arrangement for the driving of an electrical load, the power supply comprising:

a driver circuit comprising:

a driver output configured to provide a driver signal to a current source of a load circuit that is configured to be coupled, the load circuit comprising the current source and a means for connecting the electrical load, and a signal output configured to provide a measurement signal that is configured to be determined by a measurement of a current value of the driver signal and is provided for the setting of an output voltage, wherein the output voltage is configured to be fed to the load circuit that is configured to be coupled; and a voltage regulator comprising:

a voltage regulator input for the feeding of an input voltage, a voltage regulator output to which the load circuit is configured to be coupled and to which the output voltage is configured to be tapped, and a feedback input for the feeding of a feedback signal that is configured to be determined from the measurement signal or a signal derived from this measurement signal and that is adapted for the setting of the voltage conversion from the input voltage into the output voltage.

\* \* \* \* \*